(12) United States Patent
Sillard et al.

(10) Patent No.: US 6,643,438 B1
(45) Date of Patent: Nov. 4, 2003

(54) OPTICAL FIBER WITH COMPENSATION OF CHROMATIC DISPERSION

(75) Inventors: Pierre Sillard, Paris (FR); Louis-Anne de Montmorillon, Paris (FR); Ludovic Fleury, Bois d'Arcy (FR); Pascale Nouchi, Maisons Laffitte (FR)

(73) Assignee: Alcatel, Paris (FR)

( * ) Notice: Subject to any disclaimer, the term of this patent is extended or adjusted under 35 U.S.C. 154(b) by 413 days.

(21) Appl. No.: 09/649,095

(22) Filed: Aug. 28, 2000

Related U.S. Application Data

(63) Continuation-in-part of application No. 09/372,087, filed on Aug. 11, 1999.

Foreign Application Priority Data

Jun. 29, 1999 (FR) ............................................. 99-08298

(51) Int. Cl.$^7$ ................................................. G02B 6/26
(52) U.S. Cl. ........................................ 385/123; 385/27
(58) Field of Search ................................ 385/123, 124, 385/27

(56) References Cited

U.S. PATENT DOCUMENTS

| | | | | |
|---|---|---|---|---|
| 5,033,846 A | * | 7/1991 | Hernday et al. | ........... 356/73.1 |
| 5,224,183 A | * | 6/1993 | Dugan | .......................... 385/24 |
| 5,781,673 A | * | 7/1998 | Reed et al. | .................... 385/24 |
| 5,854,871 A | * | 12/1998 | Akasaka | ...................... 385/123 |
| 5,887,093 A | * | 3/1999 | Hansen et al. | ................ 385/27 |

\* cited by examiner

Primary Examiner—Frank G. Font
Assistant Examiner—Michael P. Mooney
(74) Attorney, Agent, or Firm—Sughrue Mion, PLLC

(57) ABSTRACT

An optical fiber is disclosed for compensating the chromatic dispersion of on optical fiber with positive chromatic dispersion advantageously has, at a wavelength of 1 550 nm, a chromatic dispersion less than −40 ps/(nm.km), or even less than −50 ps/(nm.km), a ratio between the chromatic dispersion and the chromatic dispersion slope from 50 nm to 230 nm, an effective surfaced area greater than 12 $\mu m^2$ and curvature losses less than or equal to 0.05 dB. It is used for in-line compensation of cumulative chromatic dispersion in a line fiber with positive chromatic dispersion. Also disclosed is a fiber optic transmission system using a fiber of the above kind to compensate cumulative chromatic dispersion in the line fiber.

30 Claims, 2 Drawing Sheets

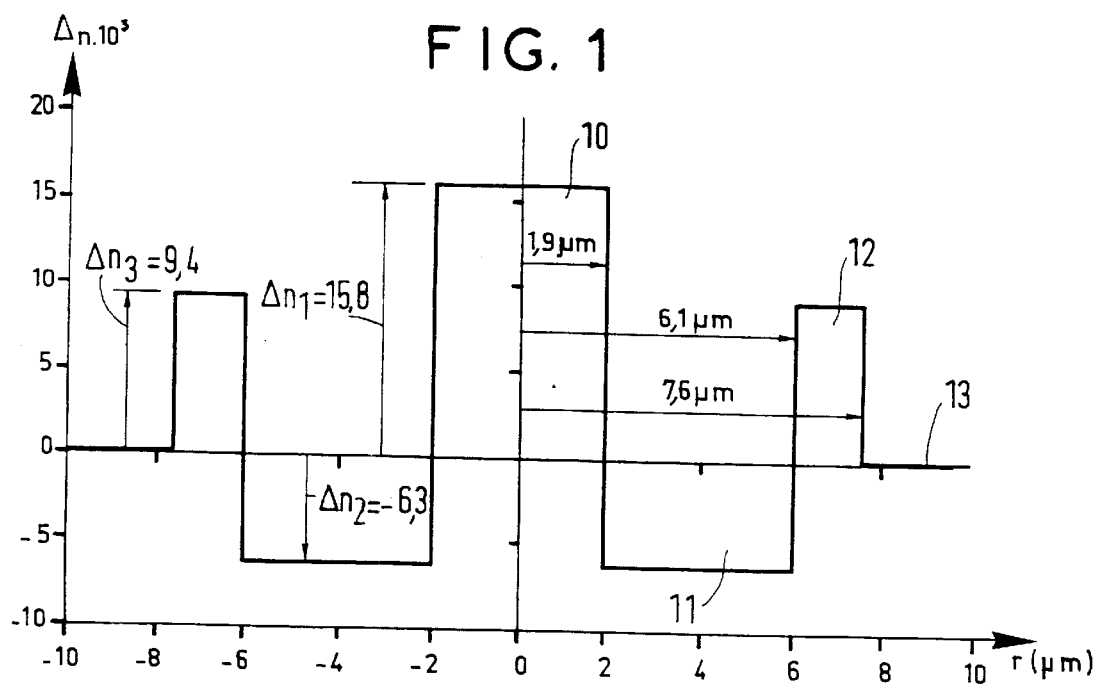
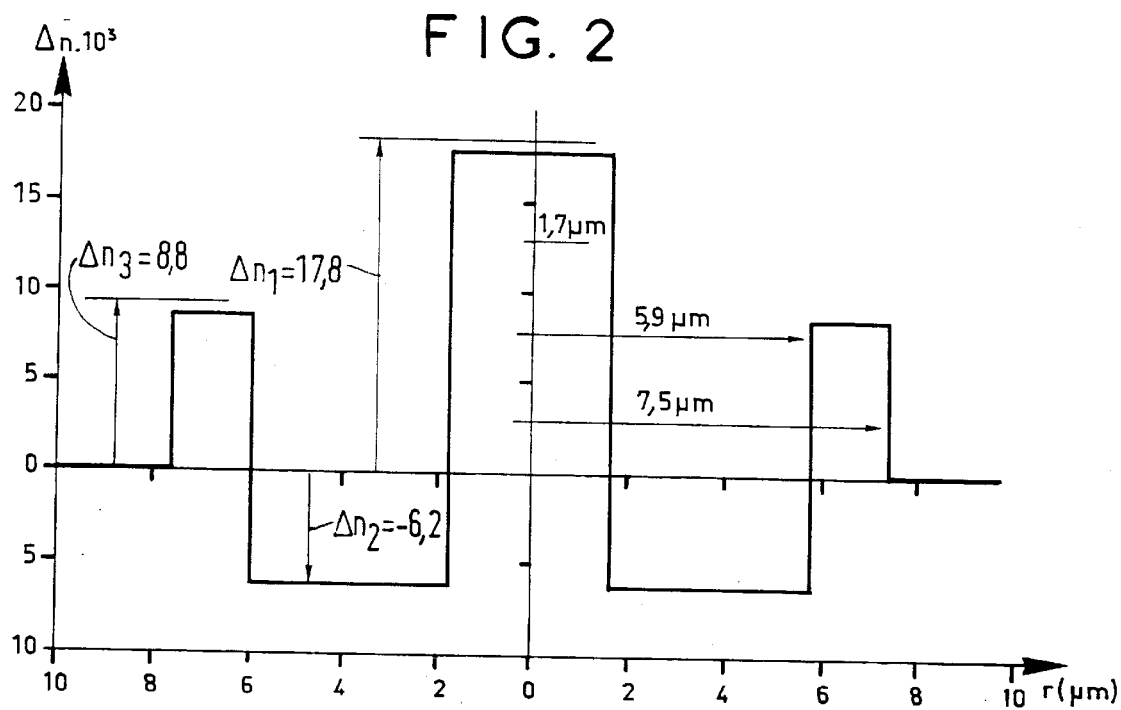

OPTICAL FIBER WITH COMPENSATION OF CHROMATIC DISPERSION

This is a Continuation-in-part of application Ser. No. 09/372,087 filed Aug. 11, 1999.

BACKGROUND OF THE INVENTION

1. Field of the invention

The present invention relates to fiber optic transmission.

2. Description of the prior art

The index profile of optical fibers is generally qualified as a function of the shape of the graph of the function relating the refractive index of the fiber to its radius. The distance r of a point from the center of the fiber is conventionally plotted on the abscissa axis with the difference between the refractive index at that point and that of the cladding of the fiber plotted on the ordinate axis. The expressions "stepped", "trapezium" and "triangle" are therefore used in connection with index profiles to refer to graphs which are respectively step-shaped, trapezium-shaped and triangular. The curves are generally representative of the theoretical or set point profile of the fiber but fiber fabrication constraints can produce a significantly different profile.

In new high bit rate wavelength division multiplex transmission networks it is advantageous to control chromatic dispersion, especially for bit rates of 10 Gbit/s per channel and above. The objective is to limit the broadening of pulses by obtaining substantially zero cumulative chromatic dispersion of the link for all wavelength values of the multiplex A cumulative dispersion value of a few hundred ps/nm is generally acceptable. It is also beneficial to avoid zero values of chromatic dispersion, for which non-linear effects are greater, in the vicinity of the wavelengths used in the system. Finally, it is also beneficial to limit the chromatic dispersion slope over the range of the multiplex to prevent or limit distortion between the channels of the multiplex.

Single mode fibers (SMF) with a stepped index profile are conventionally used as line fibers in fiber optic transmission systems. The assignees of the inventors sell under the designation ASMF 200 a stepped index monomode fiber having a chromatic dispersion cancellation wavelength $\lambda_0$ from 1 300 nm to 1 320 nm and a chromatic dispersion less than or equal to 3.5 ps/nm/km in a range from 1 285 nm to 1 330 nm and equal to 17 ps/nm.km at 1 550 nm. The chromatic dispersion slope at 1 550 nm is of the order of 0.06 ps/nm$^2$.km.

To compensate the chromatic dispersion and the chromatic dispersion slope of these SMF, which were originally installed to operate at around 1 310 nm and are now to be used as line fibers in a window around 1 550 nm, the document WO 98/04941 describes a dispersion compensating fiber (DCF) having a high negative chromatic dispersion value, typically less than −150 ps/nm.km, at 1 550 nm. To limit non-linear effects, the fiber has an effective mode surface area greater than 30 $\mu m^2$ at 1 550 nm. Also, in one of the embodiments described in the above document, the chromatic dispersion slope of the fiber can be from −5 ps/nm$^2$.km to −0.1 ps/nm$^2$.km at 1 550 nm.

These values enable it to compensate the dispersion of a non-zero dispersion shifted fiber (NZ-DSF) whose chromatic dispersion is from 6 ps/nm.km to 10 ps/nm.km and whose chromatic dispersion slope is less than 0.07 ps/nm$^2$.km at 1 550 nm.

DSF have substantially no chromatic dispersion at the transmission wavelength at which they ore used, which is generally different from the wavelength of 1.3 $\mu$m at which silica has substantially zero dispersion. In other words, the non-zero chromatic dispersion of the silica is compensated (hence the use of the term "shifted") by increasing the index difference Δn between the core of the fiber and the optical cladding. The index difference shifts the wavelength at which there is substantially zero chromatic dispersion. It is obtained by introducing dopants into the preform during its fabrication, for example by an MCVD process known in the art and not described in detail here.

NZ-DSF have a non-zero chromatic dispersion at the wavelength at which they are used.

The DCF described in the document WO 98/04941, although having optical characteristics such that it could compensate the dispersion of DSF and NZ-DSF, and more particularly fiber having the characteristics mentioned above, is not suitable because it has very high curvature losses (of the order of 0.3 dB/m for a winding of 100 turns with a radius of 30 mm) because of the limited index difference between the central part of its core and its optical cladding.

The object of the present invention is to provide a dispersion compensating fiber capable in particular of compensating the chromatic dispersion of an NZ-DSP whose chromatic dispersion is from 5 ps/nm.km to 11 ps/nm.km and whose chromatic dispersion slope is less than 0.08 ps/nm$^2$.km at 1 550 nm, combined with curvature losses enabling it to be used effectively in current optical transmission systems.

SUMMARY OF THE INVENTION

To this end, the present invention proposes a dispersion compensating optical fiber having at a wavelength of 1 550 nm a chromatic dispersion less than or equal to −40 ps/nm.km, a negative chromatic dispersion slope, a ratio of chromatic dispersion to chromatic dispersion slope from 50 nm to 230 nm, an effective surface area greater than or equal to 12 $\mu m^2$ and curvature losses less than or equal to 0.05 dB for 100 turns wound with a radius of 30 mm.

The fiber preferably has at a wavelength of 1 550 nm a chromatic dispersion greater than or equal to −50 ps/nm.km.

The upper limit of the ratio of chromatic dispersion to chromatic dispersion slope can be chosen as 200 nm, 180 nm or 160 nm.

The lower limit of the ratio of chromatic dispersion to chromatic dispersion slope can be chosen as 80 nm, 100 nm or 120 nm.

All combinations of the above upper and lower limit values can be combined to determine a preferred range for the ratio.

In one embodiment the fiber has at a wavelength of 1 550 nm on effective surface area greater than or equal to 15 $\mu m^2$ and preferably greater than or equal to 20 $\mu m^2$.

In another embodiment the fiber has at a wavelength of 1 550 nm an attenuation less than or equal to 1 dB/km.

In a further embodiment the fiber has at a wavelength of 1 550 nm a mode diameter greater than or equal to 4 µm.

The fiber advantageously has at a wavelength of 1 550 nm a sensitivity to microcurvatures less than or equal to 1 and preferably less than or equal to 0.5.

The fiber can have a rectangular index profile with a depleted trench and a ring. In this case the difference between the index of the buried part and the index of the cladding is preferably greater than or equal to $-8 \times 10^{-3}$.

The invention also proposes use of a fiber in accordance with the invention as compensating fiber in a wavelength division multiplex fiber optic transmission system.

The compensation fiber can then be incorporated into a cable and used as line fiber or placed in a compensation module.

The invention then proposes a wavelength division multiplex fiber optic transmission system comprising a first line fiber section and a second line fiber section according to the invention.

The line fiber of the first section advantageously has at a wavelength of 1 550 nm a chromatic dispersion from 5 ps/nm.km to 11 ps/nm.km and a chromatic dispersion slope less than or equal to 0.08 ps/nm².km.

In one embodiment the ratio of the length of the first section to the length of the second section is substantially the reciprocal of the absolute value of the ratios of the chromatic dispersions at 1 550 nm of the fibers of the first section and the second section.

The cumulative chromatic dispersion for each channel between 1 530 nm and 1 620 nm is advantageously less than 100 ps/nm and preferably less than 50 ps/nm on average over 100 km of transmission.

The invention finally proposes a wavelength division multiplex fiber optic transmission system comprising line fiber and fiber in accordance with the invention as compensation fiber in a compensation module.

The line fiber of the first section advantageously has at a wavelength of 1 550 nm a chromatic dispersion from 5 ps/nm.km to 11 ps/nm.km and a chromatic dispersion slope less than or equal to 0.08 ps/nm².km.

The ratio of the length of the line fiber to the length of the compensation fiber is preferably substantially the reciprocal of the absolute value of the ratio of the chromatic dispersions at 1 550 nm of the line fiber and the compensation fiber.

The cumulative chromatic dispersion for each channel from 1 530 nm to 1 620 nm is advantageously less than 100 ps/nm and preferably less than 50 ps/nm on average over 100 km of transmission.

Other features and advantages of the invention will become apparent on reading the following description of embodiments of the invention, which description is given by way of example and with reference to the accompanying drawings.

BRIEF DESCRIPTION OF THE DRAWINGS

FIGS. 1 to 3 are diagrammatic representations of the fiber-set point index profile for various embodiments of the invention.

DETAILED DESCRIPTION OF THE PREFERRED EMBODIMENTS

The invention proposes a dispersion compensating fiber which has, at a wavelength of 1 550 nm, a chromatic dispersion less than −40 ps/nm.km, a negative chromatic dispersion slope, a ratio of chromatic dispersion to chromatic dispersion slope from 5.0 nm to 230 nm, an effective surface area greater than 12 µm² and curvature losses less than or equal to 0.05 dB.

The preferred characteristics of the fiber according to the invention are therefore as follows:

chromatic dispersion at 1 550 nm less than −40 ps/nm.km and preferably less than or equal to −50 ps/nm.km and greater than or equal to −150 ps/nm.km;

ratio of chromatic dispersion to chromatic dispersion slope at 1 550 nm from 50 nm to 230 nm, preferably from 80 nm to 200 nm, more preferably from 100 nm to 180 nm, or even more preferably from 120 nm to 160 nm;

effective surface area greater than 12 µm², even 15 µm², or preferably 20 µm²;

sensitivity to microcurvatures of 1 550 nm less than or equal to 1, or preferably less than or equal to 0.5; and curvature losses at 1 550 nm less than or equal to 0.05 dB, and preferably less than $5 \times 10^{-3}$ dB.

The fiber of the invention can be used for in-line compensation of an NZ-DSF whose chromatic dispersion is from 6 ps/nm.km to 10 ps/nm.km and whose chromatic dispersion slope is less than 0.07 ps/nm².km at 1 550 nm, or fibers of the same type. It is particularly suitable for fibers having, at 1 550 nm, a chromatic dispersion from 5 ps/nm.km to 11 ps/nm.km and a chromatic dispersion slope less than 0.08 ps/nm².km, in particular because of the ratio between its chromatic dispersion and chromatic dispersion slope, which is from 50 nm to 230 nm.

It can be used as a component of a compensation module, i.e. not as line fiber but in a discrete module. It then preferably has an effective cut-off wavelength less than or equal to 1 550 nm, complying with the G.650 standard of the ITU-T.

It can also be incorporated in a cable and used as compensating line fiber, preferably with an in-cable cut-off wavelength less than or equal to 1300 nm.

The fiber of the invention can be used in very high bit rate transmission systems using wavelength division multiplexing, for example bit rates of N×20 Gbit/s or N×40 Gbit/s.

As known in the art, curvature losses are evaluated by measuring the losses induced in a fiber by winding 100 turns of the fiber onto a 30 mm radius drum. The relative sensitivity to microcurvatures is evaluated relative to the ASMF 200 fiber sold by the assignees of the inventors. The method known in the art of crushing the fiber between two grids can be used.

Figure 3:
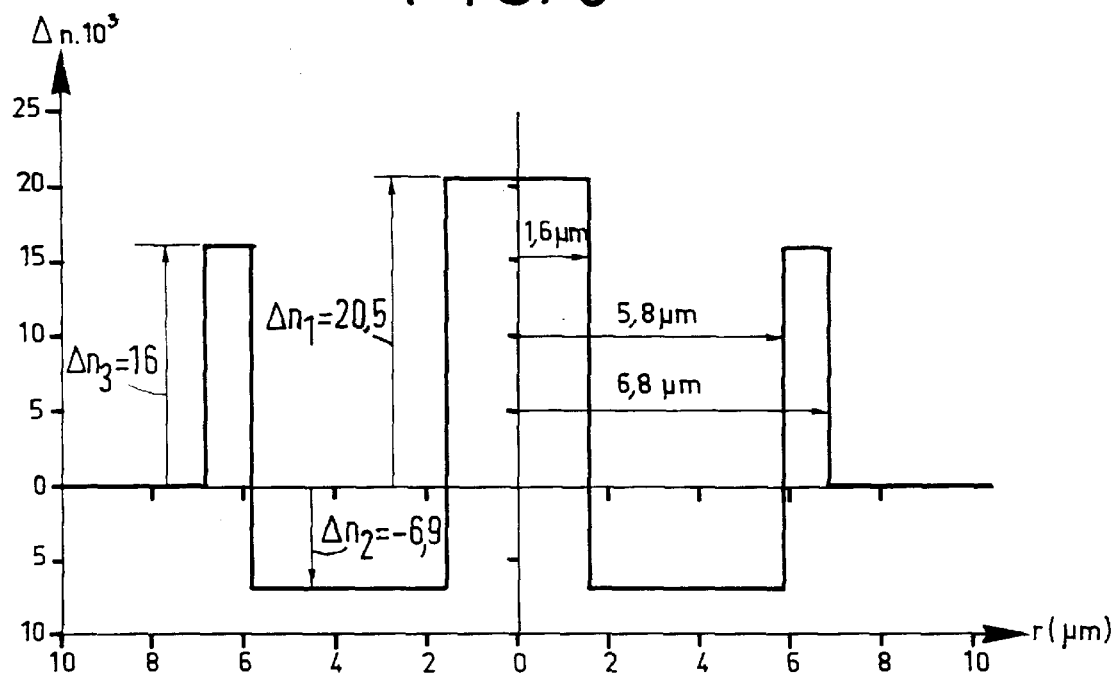

Examples of fiber profiles achieving such values are given in the remainder of the description with reference to the figures. The profiles shown in FIGS. 1 to 3 are exactly the same shape and vary in terms of the numerical values of the radii and indices.

FIG. 1 is a schematic representation of a set point index profile of a first embodiment of a fiber according to the invention. In this embodiment the index profile is a rectangular index profile with a buried trench, a ring and an optical cladding, which has, starting from the center of the fiber, constituting an index profile referred to as "rectangular with a buried or depleted trench":

- a central part 10 of substantially constant index greater than or equal to the index of the optical cladding 13,
- an annular part or buried trench 11 whose index is less than or equal to the index of the cladding 13, the index difference relative to the cladding preferably being greater than $-8\times10^{-3}$; a minimum value of the index difference of this magnitude facilitates fabrication of the fiber,
- an annular part or ring 12 whose index is greater than or equal to the index of the cladding 13 and less than or equal to that of the central part 10, and
- an optical cladding 13.

The fiber shown in FIG. 1 has an annular part or ring 11 around the buried trench, i.e. a port whose index is higher than the index of the cladding 13, whence the designation "rectangular with a buried trench and a ring".

The index and radii values for the embodiment shown in FIG. 1 are as follows. The central rectangle has a radius $r_1$ of 1.9 μm and the difference $\Delta n_1$ between its index and the index of the cladding is $15.8\times10^{-3}$.

The buried trench lies between the radii $r_1$ and $r_2$, where $r_2=6.1$ μm, and the difference $\Delta n_2$ between its index and the index of the cladding is $-6.3\times10^{-3}$.

The ring extends around the trench, between the radii $r_2$ and $r_3$, where $r_3=7.6$ μm. Its index difference $\Delta n_3$ relative to the cladding is $9.4\times10^{-3}$.

The cladding of the fiber, relative to which the index differences are measured, extends around the ring.

The above values produce a fiber having the following characteristics;

- cut-off wavelength $\lambda_c$: 1 773 nm
- effective surface area at 1 550 nm: 22 μm$^2$
- chromatic dispersion at 1 550 nm; −51 ps/nm.km
- chromatic dispersion slope at 1 550 nm: −0.35 ps/nm$^2$.km
- ratio of chromatic dispersion to chromatic dispersion slope: 145 nm
- mode diameter 2W$_{02}$ at 1 550 nm: 5.2 μm
- attenuation due to curvatures at 1 550 nm, for 100 turns on a 30 mm radius spool: $\leq 10^{-5}$ dB
- sensitivity to microcurvatures at 1 550 nm: 0.5

The cut-off wavelength given here is the theoretical cut-off wavelength. In practice, the effective cut-off wavelength according to the G.650 standard of the ITU-T and the wavelength measured in a cable are a few hundred nm less than this. Clearly the fiber is effectively a monomode fiber in the range of wavelengths of the payload signals, for example from 1 530 nm to 1 620 nm.

FIG. 2 is a diagrammatic representation of the index profile of another fiber according to the invention, and shows clearly that the profile has a similar shape to that shown in FIG. 1, with different numerical values. Those values are as follows. The rectangle has a radius $r_1$ of 1.7 μm and the difference $\Delta n_1$ between its index and the index of the cladding is $17.8\times10^{-3}$.

The buried trench extends around the rectangle up to a radius $r_2$ of 5.9 μm and the difference $\Delta n_2$ between its index and the index of the cladding is $-6.2\times10^{-3}$.

The ring extends around the trench, up to a radius $r_3$ of 7.5 μm, and its index difference $\Delta n_3$ relative to the index of the cladding is $8.8\times10^{-3}$.

The cladding of the fiber, relative to which the index references are measured, extends around the ring.

The above values produce a fiber having the following characteristics:

- cut-off wavelength $\lambda_c$: 1 788 nm
- effective surface area at 1 550 nm: 20.5 μm$^2$
- chromatic dispersion of 1 550 nm: −75 ps/nm.km
- chromatic dispersion slope at 1 550 nm: −0.51 ps/nm$^2$.km
- ratio of chromatic dispersion to chromatic dispersion slope: 147 nm
- mode diameter 2W$_{02\ at}$ 1 550 nm: 5 μm
- attenuation due to curvatures at 1 550 nm, for 100 turns on a −30 mm radius spool: $\leq 10^{-5}$ dB
- sensitivity to microcurvatures at 1 550 nm: 0.45

The embodiment shown in FIG. 3 corresponds to a fiber whose chromatic dispersion is even higher than that of the previous fibers. The index and radius values are as follows:

$r_1=1.6$ μm, $\Delta n_1=20.5\times10^{-3}$
$r_2=5.8$ μm, $\Delta n_2=-6.9\times10^{-3}$
$r_3=6.8$ μm, $\Delta n_3=16\times10^{-3}$ The following characteristics are obtained for the fiber shown in FIG. 3:

- cut-off wavelength $\lambda_c$: 1 790 nm
- effective surface area at 1 550 nm: 19 μm$^2$
- chromatic dispersion at 1 550 nm: −106 ps/nm.km
- chromatic dispersion slope at 1 550 nm: −0.74 ps/nm$^2$.km
- ratio of chromatic dispersion to chromatic dispersion slope: 142 nm
- mode diameter 2W$_{02}$ at 1 550 nm: 4.8 μm
- attenuation due to curvatures at 1 550 nm, for 100 turns on a 30 mm radius spool: $\leq 10^{-4}$ dB
- sensitivity to microcurvatures at 1 550 nm: 0.5

In all the above embodiments, similar results are obtained with 5% variations An$_1$ in the index of the central part or 10% variations $\Delta n_2$ and $\Delta n_3$ in the indices of the buried trench and the ring. Likewise the radii can individually vary 5% relative to the values given for the examples shown in the figures to achieve similar results.

Figure 4:
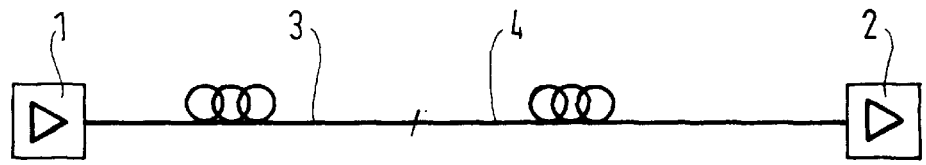
FIG. 4 is a diagrammatic representation of a section of a transmission system using dispersion compensating fiber according to the invention.

More generally, profiles satisfying the conditions of the invention have of least the following characteristics:

$12\times10^{-3}\leq \Delta n_1\leq 40\times10^{-3}$ and preferably $15\times10^{-3}\leq \Delta n_1\leq 30\times10^{-3}$ $-8\times10^{-3}\leq \Delta n_2\leq -3\times10^{-3}$, and preferably $-8\times10^{-3}\leq \Delta n_2\leq -4\times10^{-3}$ $1\leq r_1\leq 2.5$ μm, and preferably $1.3\leq r_1\leq 2.2$ μm $6\leq r_3\leq 10$ μm, and preferably $6.5\leq r_3\leq 9$ μm The profiles satisfying the conditions of the invention can further have the following additional characteristics:

$0.5\times10^{-3}\leq \Delta n_3\leq 20\times10^{-3}$, and preferably $2\times10^{-3}\leq \Delta n_3\leq 18\times10^{-3}$ $4\leq r_2\leq 7$ μm, and preferably $4.5\leq r_2\leq 6.5$ μm FIG. 4 is a diagrammatic representation of part of a transmission system using the dispersion compensating fiber according to the invention as line fiber FIG. 4 shows two adjoining amplifiers 1 and 2 of the transmission system. The line fiber between the two amplifiers includes a section 3 of NZ-DSF of the type described above (i.e. fiber having a chromatic dispersion from 5 ps/nm.km to 11 ps/nm.km and a chromatic dispersion slope less than 0.08 ps/nm².km at 1 550 nm) and a section 4 of fiber according to the invention. The fiber of the first section has a chromatic dispersion of 8 ps/nm.km at 1 550 nm and a chromatic dispersion slope of 0.055 ps/nm².km at the some wavelength. The use in the second section of a dispersion compensating fiber conforming to the FIG. 1 embodiment compensates the cumulative chromatic dispersion in the first section of fiber over the range of wavelengths of the multiplex The ratio between the chromatic dispersion and the chromatic dispersion slope of the dispersion compensating fiber is 145 nm. The ratio of the chromatic dispersion to the chromatic dispersion slope of the line fiber of the first section is 145 nm.

The ratio of the respective lengths of the first and second section fibers is chosen to minimize the cumulative chromatic dispersion of the link and in this example can be of the order of 6.4, i.e. close to the reciprocal of the chromatic dispersion ratio 8/51.

In this case, for an 86 km first fiber section and a 14 km compensation fiber section, the cumulative chromatic dispersion for the multiplex channel at 1 550 nm is close to 0 ps/nm.

Over the range of the multiplex, i.e. from 1 530 nm to 1 620 nm, the cumulative chromatic dispersion is less than 50 ps/nm for each channel over the 100 km of the first and second sections. Thus the cumulative chromatic dispersion is limited to values less than 100 ps/nm for each channel, on average and over 100 km, as indicated above.

The skilled person can use techniques known in the art to fabricate the fiber according to the invention, such as the MCVD technique or other techniques routinely used in the fabrication of optical fibers.

Of course, the present invention is not limited to the examples and embodiments described and shown and is open to many variants that will suggest themselves to the skilled person. Clearly the profiles shown in FIGS. 1 to 3 are merely examples and other profiles can produce fibers having the features of the invention. The fiber of the invention can be used in the some way as in the FIG. 4 embodiment in a transmission system with repeaters or in a repeaterless transmission system.

What is claimed is:

1. A dispersion compensating optical fiber having at a wavelength of 1 550 nm a chromatic dispersion less than or equal to −40 ps/nm.km, a negative chromatic dispersion slope, a ratio of chromatic dispersion to chromatic dispersion slope from 50 nm, to 230 nm, an effective surface area greater than or equal to 12 $\mu m^2$ and curvature losses less than or equal to 0.05 dB for 100 turns wound with a radius of 30 mm.

2. The fiber claimed in claim 1 which has at a wavelength of 1 550 nm a chromatic dispersion greater than or equal to −150 ps/nm.km.

3. The fiber claimed in claim 1 which has at a wavelength of 1 550 nm a chromatic dispersion less than or equal to −50 ps/nm.km.

4. The fiber claimed in claim 1 which has at a wavelength of 1 550 nm a ratio of chromatic dispersion to chromatic dispersion slope less than 200 nm.

5. The fiber claimed in claim 1 which has at a wavelength of 1 550 nm a ratio of chromatic dispersion to chromatic dispersion slope less than 180 nm.

6. The fiber claimed in claim 1 which has at a wavelength of 1 550 nm a ratio of chromatic dispersion to chromatic dispersion slope less than 160 nm.

7. The fiber claimed in claim 1 which has at a wavelength of 1 550 nm a ratio of chromatic dispersion to chromatic dispersion slope greater than 80 nm.

8. The fiber claimed in claim 1 which has at a wavelength of 1 550 nm a ratio of chromatic dispersion to chromatic dispersion slope greater than 100 nm.

9. The fiber claimed in claim 1 which has at a wavelength of 1 550 nm a ratio of chromatic dispersion to chromatic dispersion slope greater than 120 nm.

10. The fiber claimed in claim 1 which has at a wavelength of 1 550 nm an effective surface area greater than or equal to 15 $\mu m^2$ and preferably greater than or equal to 20 $\mu m^2$.

11. The fiber claimed in claim 1 which has at a wavelength of 1 550 nm an attenuation less than or equal to 1 dB/km.

12. The fiber claimed in claim 1 which has at a wavelength of 1 550 nm a mode diameter greater than or equal to 4 $\mu m$.

13. The fiber claimed in claim 1 which has at a wavelength of 1 550 nm a sensitivity to microcurvatures less than or equal to 1 and preferably less than or equal to 0.5.

14. The fiber claimed in claim 1 which has an external optical cladding and an index profile comprising, from the inside toward the outside, a central part whose index is greater than or equal to the index of the optical cladding, an annular part or buried part whose index is less than or equal to the index of the optical cladding, an annular part or ring whose index is greater than or equal to the index of the optical cladding and less than or equal to that of the central part, and an optical cladding.

15. The fiber claimed in claim 14 wherein the difference between the index of the buried part and the index of the cladding is greater than or equal to $-8 \times 10^{-3}$.

16. The fiber claimed in claim 15 which has the following characteristics:

$12 \times 10^{-3} \leq \Delta n_1 \leq 40 \times 10^{-3}$, and preferably $15 \times 10^{-3} \leq \Delta n_1 \leq 30 \times 10^{-3}$ $-8 \times 10^{-3} \leq \Delta n_2 \leq -3 \times 10^{-3}$, and preferably $-8 \times 10^{-3} \leq \Delta n_2 \leq -4 \times 10^{-3}$ $1 \leq r_1 \leq 2.5$ $\mu m$, and preferably $1.3 \leq r_1 \leq 2.2$ $\mu m$ $6 \leq r_3 \leq 10 \mu m$, and preferably $6.55 \leq r_3 \leq 9 \mu m$ where:

$\Delta n_1$ is the index difference between the central part and the cladding, $\Delta n_2$ is the index difference between the buried part and thee cladding, $r_1$ is the radius of the central part, and $r_3$ is the radius of the ring.

17. The fiber claimed in claim 16 which further has the following charcteristics:

$0.5 \times 10^{-3} \leq \Delta n_3 \leq 20 \times 10^{-3}$, and preferably $2 \times 10^{-3} \leq \Delta n_3 \leq 18 \times 10^{-3}$ $4 \leq r_2 \leq 7$ $\mu m$, and preferably $4.5 \leq r_2 \leq 6.5$ $\mu m$ where;

$\Delta n_3$ is the index difference between the ring and the cladding, and $r_2$ is the radius of the buried part.

18. A dispersion compensation fiber in a wavelength division multiplex fiber optic transmission system, said dispersion compensation fiber comprising a fiber as claimed in claim 1.

19. The dispersion compensation fiber as claimed in claims 18, wherein the compensation fiber is incorporated into a cable and used as line fiber.

20. The dispersion compensation fiber as claimed in claims 18, wherein said dispersion compensating fiber is placed in a compensation module.

21. A wavelength division multiplex fiber optic transmission system comprising a first line fiber section and a second line fiber section as claimed in claim 1.

22. The transmission system claimed in claim 21 wherein the line fiber of said first section has at a wavelength of 1 550 nm a chromatic dispersion from 5 ps/nm.km to 11 ps/nm.km.

23. The transmission system claimed in claim 21 wherein the line fiber of said first section has at a wavelength of 1 550 nm a chromatic dispersion slope less than or equal to 0.08 ps/nm$^2$.km.

24. The transmission system claimed in claim 21 wherein the ratio of the length of said first section to the length of said second section is substantially the reciprocal of the absolute value of the ratios of the chromatic dispersions at 1 550 nm of the fibers of said first section and said second section.

25. The system claimed in claim 21 wherein the cumulative chromatic dispersion for each channel between 1 530 nm and 1 620 nm is loss than 100 ps/nm and preferably less than 50 ps/nm on average over 100 km of transmission.

26. A wavelength division multiplex fiber optic transmission system comprising line fiber and fiber as claimed in claim 1 as compensation fiber in a compensation module.

27. The transmission system claimed in claim 26 wherein said line fiber has at a wavelength of 1 550 nm a chromatic dispersion from 5 ps/nm.km to 11 ps/nm.km.

28. The transmission system claimed in claim 26 wherein said line fiber has at a wavelength of 1 550 nm a chromatic dispersion slope less than or equal to 0.08 ps/nm$^2$.km.

29. The transmission system claimed in claim 26 wherein the ratio of the length of said line fiber to the length of said compensation fiber is substantially the reciprocal of the absolute value of the ratio of the chromatic dispersions at 1 550 nm of said line fiber and said compensation fiber.

30. The transmission system claimed in claim 26 wherein the cumulative chromatic dispersion for each channel from 1 530 nm to 1 620 nm is less than 100 ps/nm and preferably less than 50 ps/nm on average over 100 km of transmission.

* * * * *